(12) United States Patent
Cong et al.

(10) Patent No.: US 8,745,082 B2
(45) Date of Patent: Jun. 3, 2014

(54) METHODS AND APPARATUS FOR EVALUATING XPATH FILTERS ON FRAGMENTED AND DISTRIBUTED XML DOCUMENTS

(75) Inventors: Gao Cong, Beijing (CN); Wenfei Fan, Wayne, PA (US); Anastasios Kementsietsidis, Edinburgh (GB)

(73) Assignee: Alcatel Lucent, Paris (FR)

( * ) Notice: Subject to any disclaimer, the term of this patent is extended or adjusted under 35 U.S.C. 154(b) by 1755 days.

(21) Appl. No.: 11/771,286

(22) Filed: Jun. 29, 2007

(65) Prior Publication Data

US 2009/0006329 A1 Jan. 1, 2009

(51) Int. Cl.
*G06F 17/30* (2006.01)

(52) U.S. Cl.
USPC .......................................................... 707/770

(58) Field of Classification Search
USPC .................................................................. 707/3
See application file for complete search history.

(56) References Cited

U.S. PATENT DOCUMENTS

| | | | | | |
|---|---|---|---|---|---|
| 5,924,094 | A | * | 7/1999 | Sutter .............................. | 707/10 |
| 6,439,783 | B1 | * | 8/2002 | Antoshenkov ..................... | 707/3 |
| 6,976,210 | B1 | * | 12/2005 | Silva et al. ..................... | 715/205 |
| 2003/0065874 | A1 | * | 4/2003 | Marron et al. ................. | 711/100 |
| 2004/0111420 | A1 | * | 6/2004 | Hofstee et al. ................. | 707/100 |
| 2004/0128078 | A1 | * | 7/2004 | Haughton et al. .............. | 702/19 |
| 2006/0070004 | A1 | * | 3/2006 | Miller et al. ................... | 715/760 |
| 2007/0250471 | A1 | * | 10/2007 | Fontoura et al. ................... | 707/2 |
| 2007/0294678 | A1 | * | 12/2007 | Novoselsky ................... | 717/144 |
| 2009/0019015 | A1 | * | 1/2009 | Hijikata ............................ | 707/3 |

OTHER PUBLICATIONS

P. Buneman et al., "Using Partial Evaluation in Distributed Query Evaluation," Proc of the 32nd Int'l Conf. on Very Large Data Bases (2006).*
Abiteboul et al., "Dynamic XML Documents with Distribution and Replication", in SIGMOD, 2003.
Altinel et al., "Efficient Filtering of XML Documents for Selective Dissemination of Information", in VLDB, 2000.
Amer-Yahia et al., "Distributed Evaluation of Network Directory Queries", TKDE, 16(4):474-486, 2004.
Bremer et al., "On Distributing XML Repositories", In WebDB, pp. 73-78, 2003.
Crainiceanu et al., "Querying peer-to-peer networks using P-Trees", In WebDB, 2004.
DeWitt et al., "Parallel Database Systems: The Future of High Performance Database Systems", Commun. ACT, 35(6), 1992.

(Continued)

*Primary Examiner* — Isaac M Woo
*Assistant Examiner* — Mark E Hershley
(74) *Attorney, Agent, or Firm* — Ryan, Mason & Lewis, LLP

(57) ABSTRACT

Methods and apparatus are provided for evaluating XPath filters on fragmented and distributed XML documents. According to one aspect of the invention, a method is disclosed for evaluating a query over a tree having a plurality of fragments distributed over a plurality of sites. The method comprises the steps of identifying the plurality of sites storing at least one of the plurality of fragments of the tree; providing the query to the plurality of identified sites, wherein each of the identified sites partially evaluates the query against one of more fragments of the tree stored by the respective site; obtaining partial results from the plurality of identified sites; and composing the partial results to compute a result to the query. The query may be, for example, a boolean XPath query. The method can be performed, for example, by a coordinating site that stores a root fragment of the tree.

20 Claims, 8 Drawing Sheets

(56) References Cited

OTHER PUBLICATIONS

Ganesan et al., "Online Balancing of Range-Partitioned Data with Applications to Peer-toPeer Systems", In VLDB, 2004.
Gottlob et al., "Efficient Algorithms for Propocessing XPath Queries", In VLDB, 2002.
Alon Y. Halevy, "Theory of Answering Queries Using Views", SIGMOD Record 29(4), 2001.
Hsiao et al., "Chained Declustering: A New Availability Strategy for Multiprocessor Database Machines", In ICDE, 1990.
Jagadish et al., "Querying Network Directories", in SIGMOD, pp. 133-144 1999.
Neil D. Jones, "An Introduction to Partial Evaluation", ACM Computing Surveys, 28(3), 1996.
Christoph Koch, "Efficient Processing of Expressive Node-Selecting Queries on XML Data in Secondary Storage, A Tree Automata-based Approach", In VLDB, 2003.
D. Kossman, "The State of the Art in Distributed Query Processing", ACM Computing Surveys, pp. 442-469, 2000.
Papadimos et al., "Distributed Queries Without Distributed State", In WebDB, pp. 95-100, 2002.
Prakash Ramanan, "Efficient Algorithms for Minimizing Tree Pattern Queries", In SIGMOD, 2002.
Sawires et al., "Incremental Maintenance of Path Expression Views", In SIGMOD, 2005.
Dan Suciu, "Distributed Query Evaluation on Semistructured Data", TODS pp. 1-62, 2002.
Xu et al., "Rewriting XPath Queries Using Materialized Views", In VLDB, 2005.
Zhuge et al., "View Maintenance in a Warehousing Environment", In SIGMOD, 1995.
Cohen et al., "Labeling Dynamic XML Tree", In PODS, 2002.
Jim Gray, Where the Rubber Mets the Sky: The Semantic gap between data, Oct. 2004.
Parke Godfrey and Jarek Gryz, "A Strategy for Partial Evaluation of Views", In Intelligent Information Systems, 2000.

\* cited by examiner

*FIG. 3A*

PROCEDURE ParBoX

*Input*: An $X_{BL}$ query $q$ and a fragmented, distributed tree $T$
*Output*: The boolean value $ans$ of $q$ over $T$ 1. $q_L$ := QList($q$);
2. $S_T$ := retrieve the source tree of tree $T$;
3. for each site $S_i$ in the source tree $S_T$ do
4.     $execute(S_i,$ evalQual, $q_L)$;
5.     for each fragment $F_j$ stored in $S_i$ do
6.         annotate $S_T$ with $(V_{F_j}, CV_{F_j}, DV_{F_j})$;
7. $ans$ := evalST($S_T$);

FIG. 3B

PROCEDURE evalQual

*Input*: A list $q_L$ of sorted (sub-)queries
*Output*: A vector $F[S_i][F_j]$ for each fragment $F_j$ of site $S_i$ 1. for each subtree $F_j$ assigned to $S_i$ do
2.     $(V_{F_j}, CV_{F_j}, DV_{F_j})$ = bottomUp(root($F_j$), $q_L$);
3.     send $(V_{F_j}, CV_{F_j}, DV_{F_j})$ to the coordinating site;

PROCEDURE bottomUp

*Input*: A node $v$ and a list $q_L$ of (sub-)queries
Output: Vectors $V_v$, $CV_v$ and $DV_v$ of formulas for node $v$ 1. for each child $w$ of $v$ do
2.     $(V_w, CV_w, DV_w) := \text{bottomUp}(w, q_L)$;
3.     for each query $q_i$ in $q_L$ do
4.         $CV_v(q_i) := \text{compFm}(CV_v(q_i), V_w(q_i), OR)$;
5.         $DV_v(q_i) := \text{compFm}(DV_v(q_i), DV_w(q_i), OR)$;
6. for each query $q_i$ in $q_L$ from left to right do
7.     case $q_i$ of
8.         (c0) $\epsilon$: $V_v(q_i) := 1$;
9.         (c1) $label() = l$: $V_v(q_i) := \text{compareString}(label(), l)$;
10.        (c2) $text() = str$: $V_v(q_i) := \text{compareString}(text(), str)$;
11.        (c3) $*/q_j$: $V_v(q_i) := CV_v(q_j)$;
12.        (c4) $\epsilon[q_j]/q_k$: $V_v(q_i) := \text{compFm}(V_v(q_j), V_v(q_k), AND)$;
13.        (c5) $//q_j$: $V_v(q_i) := DV_v(q_j)$;
14.        (c6) $q_j \vee q_k$: $V_v(q_i) := \text{compFm}(V_v(q_j), V_v(q_k), OR)$;
15.        (c7) $q_j \wedge q_k$: $V_v(q_i) := \text{compFm}(V_v(q_j), V_v(q_k), AND)$;
16.        (c8) $\neg q_j$: $V_v(q_i) := \text{compFm}(V_v(q_j), NULL, NEG)$;

17.     $DV_v(q_i) := \text{compFm}(V_v(q_i), DV_v(q_i), OR)$;

FIG. 3B cont.

PROCEDURE compFm

*Input:* Two formulas $f_1$ and $f_2$ and an operator $op$
*Output:* The composed formula $ans := f_1 \; op \; f_2$ 1. case $(isFormula(f_1), isFormula(f_2))$ of
2. (c0) (0,0): if $op = NEG$ then $ans := \neg f_1$;
3. else $ans := f_1 \; op \; f_2$;
4. (c1) (0,1): if $op = AND$ then
5. if $f_1 = true$ then $ans := f_2$; else $ans := false$;
6. elseif $op = OR$ then
7. if $f_1 = true$ then $ans := true$; else $ans := f_2$;
8. (c2) (1,0): if $op = NEG$ then $ans := \neg f_1$;
9. elseif $op = AND$ then
10. if $f_2 = true$ then $ans := f_1$; else $ans := false$;
11. elseif $op = OR$ then
12. if $f_2 = true$ then $ans := true$; else $ans := f_1$;
13. (c3) (1,1): if $op = NEG$ then $ans := \neg f_1$;
14. elseif $op = AND$ then $ans := f_1 \wedge f_2$;
15. elseif $op = AND$ then $ans := f_1 \vee f_2$;

FIG. 4

| ALGORITHM | VISITS | | COMPUTATION | COMMUNICATION |
|---|---|---|---|---|
| NaiveCentralized | 1 | | $O(|T|)$ | $O(|T|)$ |
| NaiveDistributed | $card(F_{S_i})$ | | $O(|q||T|)$ | $O(|q|card(F))$ |
| ParBoX | 1 | T | $O(|q|(|T| + card(F)))$ | $O(|q|card(F))$ |
| | | P | $O(|q|(\max_{S_i}(|F_{S_i}|) + card(F)))$ | |
| Hybrid ParBoX | 1 | T | $O(|q||T|)$ | $O(|T|)$ |
| | | P | $O(|q|(\max_{S_i}(|F_{S_i}|) + card(F)))$ | |
| FullDistParBoX | $card(F_{S_i})$ | T | $O(|q|(|T| + card(F)))$ | $O(|q|card(F))$ |
| | | P | $O(|q|(\max_{S_i}(|F_{S_i}|) + card(F)))$ | |
| LazyParBoX | $card(F_{S_i})$ | T | $O(|q|(|T| + card(F)))$ | $O(|q|card(F))$ |
| | | P | $O(|q|card(F)\max_F(|F_i|))$ | |

METHODS AND APPARATUS FOR EVALUATING XPATH FILTERS ON FRAGMENTED AND DISTRIBUTED XML DOCUMENTS

FIELD OF THE INVENTION

The present invention relates generally to XML query techniques, and more particularly, to methods and apparatus for evaluating XPath filters on fragmented and distributed XML documents

BACKGROUND OF THE INVENTION

A common task in many publish-subscribe systems is the evaluation of XPath filters on XML documents. In other words, these tasks identify XPath queries that return true if the contents of the documents satisfy certain conditions that the subscribers (users) specify. In practice, many large XML documents are often vertically or horizontally fragmented (or both), and the fragments are often distributed and stored at different sites.

A number of techniques have been proposed or suggested for evaluating algorithms for XPath filters. Such techniques, however, typically only work on XML documents stored in a single site (i.e., when the documents are neither fragmented or distributed). When applied to fragmented and distributed documents, these algorithms have to visit each site in the network an unbounded number of times, ship data from one site to another, leading to heavy network traffic, and access fragments stored in different sites in a sequential manner rather than in parallel.

Partial evaluation or "program specialization" has been studied in the context of programming languages as a general optimization technique. Intuitively, given a function $f(s,d)$ and part of its input, s, partial evaluation specializes $f(s,d)$ with respect to the known input s. In other words, partial evaluation performs the part of $f$'s computation that depends only on s, and generates a partial answer, refereed to as a residual function $f'$ that depends on the as yet unavailable input d.

Partial evaluation has been found to be useful in a variety of areas, including compiler generation, code optimization and dataflow evaluation. See, for example, Neil. D. Jones, "An Introduction to Partial Evaluation," ACM Computing Surveys, 28(3), 1996. See also, P. Buneman et al, "Using Partial Evaluation in Distributed Query Evaluation," Proc. of the 32nd Int'l Conf on Very Large Data Bases (2006), incorporated by reference herein Dataflow evaluation bears sufficient connections with distributed query evaluation and is worth investigating its use in parallel query processing.

A need exists for methods and apparatus for evaluating XPath filters on fragmented and distributed XML documents

SUMMARY OF THE INVENTION

Generally, methods and apparatus are provided for evaluating XPath filters on fragmented and distributed XML documents. According to one aspect of the invention, a method is disclosed for evaluating a query over a tree having a plurality of fragments distributed over a plurality of sites. The method comprises the steps of identifying the plurality of sites storing at least one of the plurality of fragments of the tree; providing the query to the plurality of identified sites, wherein each of the identified sites partially evaluates the query against one of more fragments of the tree stored by the respective site; obtaining partial results from the plurality of identified sites; and composing the partial results to compute a result to the query. The query may be, for example, a boolean XPath query. The method can be performed, fox example, by a coordinating site that stores a toot fragment of the tree.

The identifying step can father comprises the step of evaluating a source tree. The identified sites partially generally evaluate the query substantially in parallel. The partial evaluation at each site and for each fragment performs a bottom-up evaluation of the query. The partial results comprise one or mote boolean equations that can decouple dependencies between partial evaluation processes at the plurality of sites.

A more complete understanding of the present invention, as well as further features and advantages of the present invention, will be obtained by reference to the following detailed description and drawings.

BRIEF DESCRIPTION OF THE DRAWINGS

FIGS. 3A and 3B illustrate exemplary psuedocode for an implementation of the ParBoX process and additional procedures, respectively, each incorporating features of the present invention;

FIG. 4 summarizes the complexity of the disclosed exemplary algorithms;

DETAILED DESCRIPTION

The present invention provides methods and apparatus for evaluating XPath filters on fragmented and distributed XML documents. In addition, an incremental algorithm is provided that evaluates XPath filters in response to updates of the underlying XML documents. The disclosed algorithms are based on partial evaluation, such that the same XPath filter can be evaluated at all the sites substantially in parallel. At each site, the algorithms compute partial results of the XPath filters as Boolean expressions. These partial results are assembled together via a linear scan to obtain a final answer of the XPath filter. In this manner, the dependencies among the XML fragments are decoupled, network traffic is reduced and each site is generally visited only once.

Partial Evaluation Example

Figure 1A:
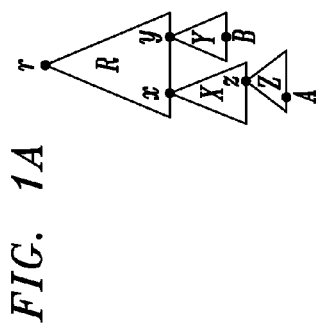
FIGS. 1A and 1B illustrate an exemplary XML tree T over which an exemplary Boolean XPath query can be applied.
Figure 1B:
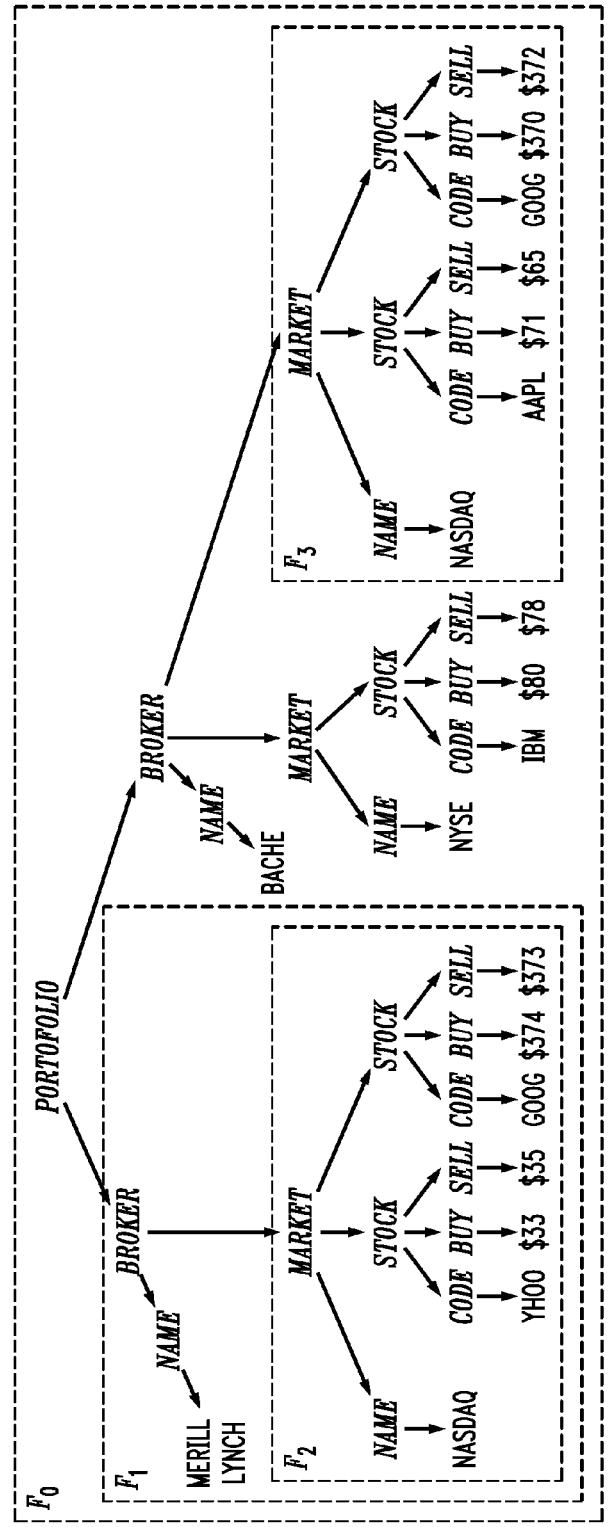

Boolean XPath queries are commonly used, for example, in publish-subscribe systems and LDAP directories FIGS. 1A and 1B illustrate an exemplary XML tree T over which a Boolean XPath query Q=[//A∧//B] can be applied. It is assumed that T consists of four subtrees, or fragments, R,X,Y and Z, and that nodes with tags A or B only occur in fragments Z and Y, as shown in FIG. 1A.

In one conventional implementation, a single depth-first traversal is performed of T, computing [//A] and [//B] simultaneously, and each node is visited exactly once. In another recursive traversal, fragments R,X,Z,X,R,Y,R are visited in order; making three visits to fragment R and two visits to fragment X. It is noted that the evaluation of the query Q can be readily treated as the Boolean function Q(R,X,Y,Z) (i.e., one whose value depends on all four fragments of the tree T). Suppose that $r_A$, $x_A$, $y_A$ and $z_A$ are variables denoting the results of [//A] respectively evaluated at the roots r of fragment R, x of fragment X, y of fragment Y and z of fragment Z, and that $r_B$, $x_B$, $y_B$, $z_B$ are defined similarly. It can be shown that:

$$Q(R,X,Y,Z)=(r_A \vee x_A \vee y_A \vee z_A) \wedge (r_B \vee x_B \vee y_B \vee z_B)$$

The results of [//A] and [//B] (the values of the variables) can be computed independently, and in parallel, in each fragment by accessing it only once. Each fragment returns the values of the corresponding variables and each time such values are received they are used to compute a partial answer for Q. Given that nodes with tags A and B only occur in fragments Z and Y, the execution of Q returns $(z_A, z_B)=(1,0)$ on fragment Z, $(y_A, y_B)=(0,1)$ on Y, $(x_A,x_B)=(z_A,z_B)$ on X and $(r_A,r_B)=(x_A \vee y_A, x_B \vee x_B)$ on R. Note that the process makes no assumption about the order in which it receives the values of the variables A partial answer is computed each time values are received from some fragment. One order might compute the answer faster than some others but except this order is of no consequence. It is also noted that some of the returned values are truth values while others are Boolean expressions. Irrespectively of the order and type of returned values, the process uses the returned values from all fragments to compute the answer to Q which, in this case, is true. This is an example of partial evaluation.

There are a number of database scenarios in which partial evaluation could be an effective optimization technique. For example, as in PDOM (U. Huck et al., "PDOM: Lightweight Persistency Support for the Document Object Model," OOPSLA (1999)), suppose a large XML tree is stored in secondary storage and is split into fragments. In this setting, the partial evaluation approach can save the cost of two swaps of fragment R and one swap of fragment X. The benefit is already evident even though there is no parallelism involved in this example.

Figure 2A:
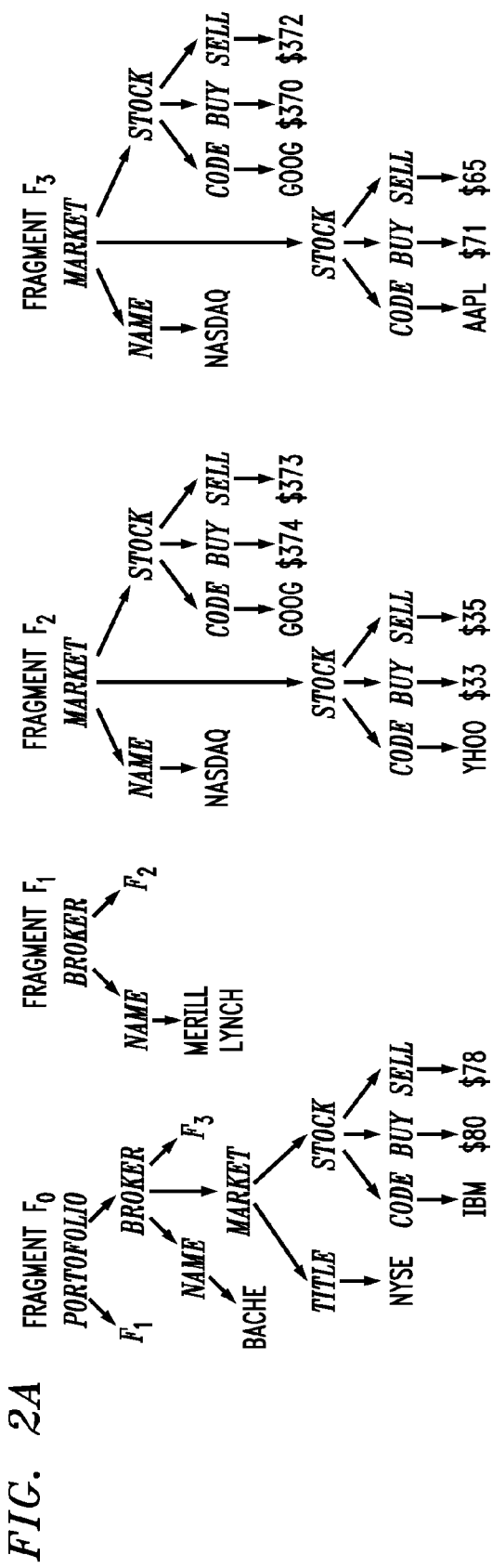
FIGS. 2A and 2B illustrate an XML tree representing an exemplary stock portfolio.
Figure 2B:
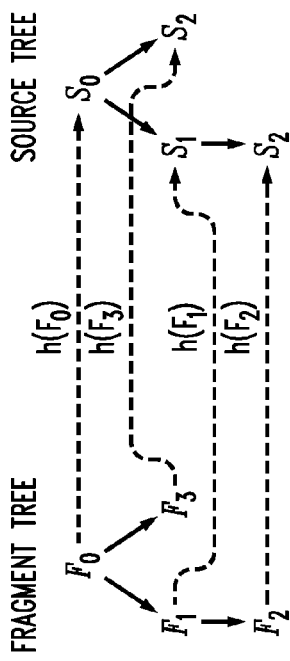

Another scenario involves fragmented XML trees that are geographically or administratively distributed over the Internet, a setting commonly found in, for example, e-commerce, Web services, or while managing large-scale network directories FIGS. 2A and 2B illustrate an XML tree that represents a person's stock portfolio. The person trades stocks through various brokers in possibly overlapping markets. For each stock, the tree stores its code, the price paid by the person to buy the stock, and the price at which the person can (currently) sell the stock. The same stock might be traded through a different broker at different periods of time and for a different price. For example, the exemplary "goog" stock is purchased both through Merill Lynch and through Bache. Although conceptually this is a single XML tree 200, in reality it is inherently distributed over the Internet. The figure uses dashed lines to show one possible fragmentation. For example, fragment $F_0$ includes the root of the tree and all the stock data from broker Bache in the NYSE market. This fragment might be stored locally in the persons' desktop. Broker Merill Lynch might require that all trade data are accessed through its own servers and thus fragment $F_1$ is stored there. In turn, the Nasdaq market might require that all its own data are only remotely accessed and only through recognized brokers. Therefore, fragments $F_2$ and $F_3$ are both stored in its own servers. The NYSE market imposes no such restrictions and so its trade data can be stored locally by Bache (and Merill Lynch, although not shown in the figure). It is noted that no assumptions ate made about the size of the fragments, their storage location, or the number of fragments assigned to each location. In a variety of applications, there may not be control over these parameters and their values are imposed by the environment.

Assume that the portfolio owner wants to know whether the "goog" stock reaches a selling price of $376. To do so, the owner must execute the boolean query Q=[//stock [code="goog"∧sell=376]]. There are two popular alternatives to execute such a query. The first alternative requires for the different sources to create a stream of data to the user and the query is executed over the received stream. There are two main concerns with this approach: (a) A large part of the tree that is later deemed irrelevant to the query, including the subtree for the NYSE market and the information for the "yhoo" and "aapl" stocks, needs to be sent to the user, causing increased network traffic. The user might want to execute the query and be notified on-the-go, using a mobile device, like a cell phone. Streaming large data sets to the cell phone is particularly unrealistic. (b) Business or personal data are typically kept local at trusted sites, and are not shipped to other sites for security or privacy concerns. In industry and research, similar concerns have generated increasing interest, and a pre emergent shift, towards shipping the processing (queries) to the data, instead of shipping (air streaming) the data to the processing.

The second alternative is to use a publish-subscribe system. Assuming that the tree in FIG. 1A is part of such a system, the user needs to issue query Q over the system and whenever the query predicate is satisfied, the user is notified. Publish-subscribe systems are more in-line with moving the processing to the data. However, any publish-subscribe system implementing the optimal centralized algorithm in XPath query processing would require a single depth-first traversal of the document tree visiting, in the present example, twice the Nasdaq server.

The present invention employs partial evaluation as a practical query processing technique since it ensures that each remote site is visited only once. Moreover, while a depth-first traversal serializes the processing of the different fragments, partial evaluation can speed-up query processing since fragments at different sites are processed in parallel. Unlike streaming, partial evaluation executes the queries where the data reside, thus minimizing network traffic and facilitating the execution of (complex) queries over devices with limited bandwidth.

According to one aspect of the present invention, several algorithms for evaluating Boolean XPath queries over a fragmented tree are provided, typically with the following performance guarantees. (a) Each site holding a fragment is visited only once. (b) The total network traffic is bounded by the size of the query and the number of fragments, and is independent of the size of the XML document. (c) The total amount of computation performed at all sites holding a fragment is comparable to the computation of the optimal centralized algorithm over the whole tree. (d) The algorithm does not impose any condition on how the XML documents are fragmented, what the sizes of these fragments are, or how they are assigned to sites.

According to another aspect of the present invention, an incremental maintenance algorithm is provided for Boolean XPath views. Cached views and their incremental maintenance are important for efficient query answering. The exemplary disclosed incremental maintenance algorithm has the following features: (a) The computation is localized so that only the site where the updates take place is visited, and reevaluation is only conducted on the updated fragment; no other sites or fragments are visited. (b) The total network traffic does not depend on the data or the update.

The present invention optionally provides a Boolean XPath evaluation and incremental maintenance algorithms with a performance guarantee in distributed systems. The technique generalizes to data selection XPath queries, as discussed below. Boolean queries are considered to focus on partial evaluation and to simplify the discussion.

XML Tree Fragmentation

An XML tree T is decomposed into a collection F of disjoint trees, or fragments $F_i$, which we distributed to and stored in different sites. A tree may be fragmented for administrative reasons (e.g., different sites ate inherently responsible for maintaining different parts of the tree), or for efficiency (e.g., the tree might be too big to stole in a single site). Constraints are not imposed on the fragmentation (an arbitrary "nesting" of fragments is allowed). Each fragment can appear at any level of the tree, and different fragments may have different sizes (in terms of number of nodes). Furthermore, constraints are not imposed on how the fragments are distributed: this is determined by the system. Hence the fragmentation setting is the most generic possible, making the disclosed solutions applicable in most settings. For example, FIG. 2A shows the decomposition of the tree in FIG. 1B in four fragments. The left side of FIG. 2B summarizes this decomposition in a structure called the fragment tree. Note that the fragment $F_1$ is itself fragmented.

The fragment that contains the toot of the tree T, i.e., the fragment at the root of the fragment tree, is called the root fragment. In FIG. 2 this is fragment $F_0$. Given two fragments $F_j$ and $F_k$, $F_k$ is a sub-fragment of $F_j$ if $F_k$ is a child of $F_j$ in the fragment tree. If $F_k$ is a sub-fragment of $F_j$ then there exists a node $v \in F_j$ such that the root node w of $F_k$ is a child of v in the original tree T. In FIG. 2B, fragment $F_3$ is a sub-fragment of $F_0$ and in the tree of FIG. 1B there is an edge between the broker node of $F_0$ and the root node market of $F_3$.

The relationship between a fragment and its sub-fragments is maintained to preserve the structure of the original tree T. A virtual child node with label $F_k$ is added to the v node of fragment $F_j$. While traversing fragment $F_j$, it is known that if the virtual node $F_k$ is reached, processing must "jump" to fragment $F_k$ in order to continue the traversal. In FIG. 2A, fragment $F_0$ has the virtual node $F_1$ which in turn has the virtual node $F_2$. Finally, a fragment that has no sub-fragments is referred to as a leaf fragment. In FIG. 2B, both fragments $F_2$ and $F_3$ ate leaf fragments.

As fragments are distributed among sites, it is important to keep track of where the different fragments reside. It is assumed that there is a mapping function h, that encodes the assignment of fragments to sites (sources). The right side of FIG. 2B shows a structure called the source tree, that is induced from the fragment tree and the function h. The source tree of a tree T, denoted by $S_1$, shows the names of sites where the fragments of T are stored. From the source tree, it is seen that both fragments $F_2$ and $F_3$ are stored in the same site $S_2$, the Nasdaq site.

The source tree $S_1$ is the only structure required by the exemplary embodiment of the XPath evaluation and incremental maintenance algorithms. No other information about either the fragmentation or the distribution of the XML tree is generally needed. The fragment tree was introduced to illustrate fragmentation, and is neither maintained not used by the present system Boolean XPath Consider a class of Boolean XPath queries, denoted by $X_{BL}$. A query [q] in $X_{BL}$ is syntactically defined as follows:

q:=p|p/text( )=str|label( )=A|¬ q|q∧ q|q∨ q,
p:=ϵ|A|*|p//p|p/p|p[q], where str is a string constant, A is a label (tag), ¬,∧,∨ are the Boolean negation, conjunction and disjunction operators, respectively; p is a path expression defined in terms of the empty path ϵ (self), label A, wildcard, the descendant-or-self-axis '//', child '/', and qualifier [q]. For //, $p_1$ /// is abbreviated as $p_1$// and // /$p_2$ as //$p_2$.

For example, [//broker [//stock/ code/text( )= "goog" ∧¬ (//stock/code/text( )="yhoo")]] is a query in $X_{BL}$. Note that path expressions p in $X_{BL}$ subsume tree pattern queries and beyond, which are commonly studied in the literature. As mentioned earlier, queries in $X_{BL}$ are widely used in, e.g., XML data dissemination for content-based filtering and routing of XML documents. Although Boolean queries are considered, the technique generalizes to a larger class of queries, which are discussed below. At a context node v in an XML tree T, the evaluation of a query [q] yields a truth value, denoted by val(q,v), indicating whether or not q is satisfied at v. Specifically, (a) when q is a path p, val(q,v) is "true" it and only if there exists a node reachable from v via p; (b) when q is p/text( )=str, val(q,v) is "true" if and only if there is a node u reached from v via p such that u carries text value str; similarly when q is label( )=A; (c) when q is $q_1 \wedge q_2$, val(q,v) is "true" if and only if both val(q,v) and val($q_2$,v) are true; similarly when q is $q_1 \vee q_2$ or ¬ $q_1$.

On a centralized XML tree T, i.e., when T is not decomposed and distributed, val(q,r) can be computed in O(|T||q|) time, whether is the root of T.

To simplify the presentation, two notations are introduced, which will be used in the disclosed algorithms. First, each path p is rewritten in an $X_{BL}$ query [q] to a normal form $\beta_1/, \ldots /\beta_n$, where $\beta_i$ is one of ϵ, *, // or ϵ[q']. This normalization can be achieved by using a linear-time function normalize(q), given inductively as follows:

q:=p|p/text( )=str|label( )=A|¬ q|q∧ q|q∨ q,
p:=ϵ|A|*|p//p|p/p|p[q], where the last rule combines a sequence of ϵ's into one.

Second, QList(q) is used to denote the list of all sub-queries of q. Intuitively, $q_1$ is a sub-query of q if the parse tree of $q_1$ is a subtree of that of q. QList(q) is sorted in a topological order such that for any sub-queries $q_1, q_2$ of q, if $q_1$ is a sub-query of $q_2$ then $q_1$ precedes $q_2$ in QList(q).

EXAMPLE 2.1

Consider the $X_{BL}$ query [q], where q is //stock[code/text( )="yhoo"], then normalize ([q])=ϵ [// ∈ [label( ) = stock∧
  * / ∈ [label( ) = code ∧ text( ) ="YHOO"]]],
QList([q]) = ⌊$q_1,q_2,q_3,q_4,q_5,q_6,q_7,q_8,q_9,q_{10}$⌋, where
$q_1$ = label( ) = code,   $q_2$ = (text( ) ="YHOO"),
$q_3 = q_1 \wedge q_2$,        $q_4$ =∈ ⌊$q_3$⌋,
$q_5$ = */⌊$q_4$⌋ ,         $q_6$ = (label( ) = stock),
$q_7 = q_5 \wedge q_6$,        $q_8$ =∈ ⌊$q_7$⌋,
$q_9$ = // ∈ ⌊$q_8$⌋,        $q_{10}$ =∈ ⌊$q_9$⌋

Observe that both normalize(q) and QList(q) can be computed in O(|q|) time. As a result, the total size of sub-queries in the list QList(q) is bounded by O(|q|). Furthermore, for any XPath evaluation algorithm, to evaluate q it is necessary to evaluate sub-queries in QList(q).

Distributed Query Evaluation

Consider an $X_{BL}$ query q submitted to a site S, hereafter referred to as the coordinating site. The query is to be evaluated at the root of a fragmented and distributed XML tree T. A naive evaluation collects all the fragments of tree T identified by the source tree $S_T$ at the coordinating site, and uses a centralized algorithm, e.g., the algorithm of G. Gottlob et al. "Efficient Algorithms for Processing XPath Queries," VLDB (2002). This approach is referred to as NaiveCentralized. This approach is efficient once the coordinating site gets all the data. However, the price is that large fragments need to be sent over the network, each time a query needs to be executed. In addition, since the coordinating site must store these fragments during the evaluation of q, the benefits gained by our ability to distribute large XML trees over a network are alleviated. Moreover, privacy and security concerns may prevent certain sites from releasing their data to another site.

A better solution, referred to as NaiveDistributed, customizes a centralized evaluation algorithm so that it works in a distributed fashion. A boolean XPath query can be evaluated on a single site via a single traversal of the tree T. The information from the source tree $S_1$ can be used to perform a distributed bottom-up traversal of tree T. To do this, certain information needs to be passed between the sites in the source tree $S_T$, as the distributed computation is passed back and forth from a fragment $F_i$ in site $S_j$ to one of its sub-fragments $F_k$ in site $S_1$. For example, consider the fragment and source trees in FIG. 2B. As the query for fragment $F_0$ is computed in site $S_0$, the control of computation must be passed to fragment $F_1$ in site $S_1$. At the same time, site $S_0$ has to wait for this computation to finish before it continues with fragment $F_3$ in site $S_2$. While this distributed algorithm does not require any transmission of fragments, it has two shortcomings. First, for a site $S_i$ to finish processing its fragment $F_j$, it has to wait for all the other sites that hold sub-fragments of $F_j$ to finish. Therefore, the distributed algorithm actually follows a sequential execution and does not take advantage of parallelism. Second, a site is visited as many times as the number of fragments stored in it. In the example, site $S_2$ needs to be visited twice, since it holds fragments $F_2$ and $F_3$. For each of these visits, site $S_2$ has to exchange a number of messages, resulting in increased network traffic, and its processor has to switch context once per fragment.

To overcome these limitations, the Parallel Boolean XPath (ParBoX) evaluation algorithm is disclosed, based on partial evaluation. The exemplary embodiment of the ParBoX Algorithm guarantees the following: (1) Each site is visited only once, irrespectively of the number of fragments stored in it. (2) Query processing is performed in parallel, on all the participating sites (3) The total computation on all sites is comparable to what is needed by the best-known centralized algorithm. (4) The total network traffic, in any practical setting, is determined by the size of the query rather than the XML tree.

The ParBoX Algorithm

FIG. 3A illustrates exemplary psuedocode for an implementation of the ParBoX process. The algorithm is initiated at the coordinating site which, without loss of generality, is assumed to be the site storing the root fragment of the tree T over which the $X_{BL}$ query q is evaluated. The algorithm consists of three stages:

Stage 1: Initially (lines 1-2 of Procedure ParBoX in FIG. 3A), the coordinating site uses the source tree $S_T$ to identify which other sites hold at least one fragment of tree T. In the example, coordinating site $S_0$ uses source tree in FIG. 2B to identify sites $S_1$ and $S_2$.

Stage 2: The coordinating site along with all the sites identified in the first stage evaluate, in parallel, the same input query q on all their assigned fragments (Procedure evalQual, FIG. 3B). Since fragments are parts of the tree T, query evaluation on each fragment returns a partial answer to the query q.

Stage 3: Finally (lines 5-7 of Procedure ParBoX), the coordinating site collects the partial answers from all the participating sites and all the fragments; it then composes them to compute the answer to query q.

There are two important components of the algorithm: (a) how to compute partial answers in parallel (the second stage), and (b) how to assemble the partial answers to obtain the answer to query q (the third stage).

Partial Evaluation.

There is a dependency relation between partial evaluation processes for the query q on different fragments of the xml tree T. To see this, consider an efficient evaluation of q over T via a single bottom-up traversal of T. During the traversal, at each node v the values are computed at v of all the sub-queries QList(q) of query q, where QList(q) is described above. This computation requires the (already computed) values of the QList(q) sub-queries at the children of v. At the end of the traversal, the answer to query q is computed by the values of the QList(q) queries at the root of the tree. Specifically, the answer to q is the value of the last query in QList(q).

Consider now FIG. 2A, which shows the fragments of the XML tree in FIG. 1B. These are the trees over which the sites must compute the query q. Recall that in these fragments some of the leaves are virtual nodes, i.e, they are pointers to other fragments which reside in other sites. For example, in fragment $F_1$ there is a virtual leaf node marked by $F_2$, while fragment $F_0$ has two virtual leaves, one for fragment $F_1$ and one for $F_3$. In accordance to the strategy given above, at each site S and for each fragment F, a bottom-up evaluation of query q is performed. The values of the QList(q) sub-queries are unknown for these nodes and, under normal circumstances, until these values are learned from another site the evaluation cannot proceed.

The dependencies are decoupled between partial evaluation processes and thus avoid unnecessary waiting, by introducing Boolean variables, one for each missing value of each QList(q) sub-query at each virtual node. Using these variables, the bottom-up evaluation procedure is given in FIG. 3B. Procedure bottomUp considers the root of a fragment $F_j$ and a list $q_L$ of sub-queries which is essentially the QList(q) of the initial query q. Reclusive calls of the procedure are used to perform the bottom-up traversal of the tree $F_j$ (line 2). At each node v encountered, the procedure computes the "values" of $q_L$ at v and stores the results of the computation in a vector $V_v$ which is of the same size as list $q_L$. Note that these "values" are actually Boolean formulas with those variables introduced at the virtual nodes. The computation of the $q_L$ values at v requires the values of $q_L$ computed in the children and descendants of v. To cope with this, these values are saved (lines 3-5) by maintaining only two additional vectors, namely vectors $CV_v$ and $DV_v$, that are of the same size as vector $V_v$. Intuitively, for each sub-query q' in $q_L$, $CV_v(q')$ is true if and only if there exists some child u of v such that $V_u(q')$ is true, and similarly, $DV_v(q')$ is true if and only if either $V_v(q')$ is true or there exists some descendant w of v such that $V_w(q')$ is true.

Given a query $q_i \in q_L$ at a node v, the computation of the value of $q_i$ depends on the structure of $q_i$. Different cases (lines 6-17) of the structure are considered based on the normal form given above. For example, if query $q_i$ is of the form text( )=str (line 10), then its value is true if the text content of node v is equal to the string str, and is false otherwise. More interesting is the case where $q_i$ is of the form */$q_j$ (line 11). Then, the value of $q_i$ at node v is equal to the disjunction of the values of query $q_j$ at the child nodes of v. As a consequence of recursive evaluation, this value has already been accumulated in $CV_v(q_j)$. Similarly, when $q_i$ is //$q_j$ (line 13), the value of $q_i$ at node v is the disjunction of $V_v(q_j)$ and $DV_w(q_j)$'s for the children w of v, which have again been computed due to the bottom-up processing order following the list $q_L$ of sub-queries. Finally, when $q_i$ is of the form $q_j \wedge q_k$, the value of $q_i$ is the conjunction of the values of queries $q_j$ and $q_k$. If queries $q_j$ and $q_k$ had simple Boolean values as answers, then this computation would be trivial. However, it is noted that a distinguishing characteristic of our procedure is that variables are part of the evaluation. Therefore, Boolean values are composed with variables or compose Boolean variables with other Boolean variables to create more complex formulas. Procedure compFm is responsible for composing, for each query, the truth values and/or formulas necessary to compute the value of the query. Depending on the value of the operator op it computes $f_1$ op $f_2$, which yields either a Boolean value or a Boolean formula.

EXAMPLE 3.1

Recall query q from Example 2.1. Evaluating the values of the (sub-)queries in $q_L$=QList(q) (given in Example 2.1) for the nodes in fragment $F_1$ results in the following $V_v$ vectors:
$V_{name}$=<0,0,0,0,0,0,0,0,0,0>
$V_{F_2}$=<$x_1, x_2, x_3 = x_1 \wedge x_2, x_4 = x_3, x_5 = cx_4$,
$x_6, x_7 = x_5 \wedge x_6, x_8 = x_7, x_9 = dx_8, x_{10} = x_9$>
$V_{broker}$=<0,0,0,0,$x_4$,0,0,0,$dx_8, dx_8$>
0's and 1's are used to represent the false and true values while $x_i$'s, $cx_i$'s and $dx_i$'s represent distinct variables in the $V_{F_2}$, $CV_{F_2}$ and $DV_{F_2}$ vectors, respectively, of virtual node $F_2$. Note that for each (sub-)query of node $F_2$ a new variable is introduced. Procedure bottomUp is used to partially compute the values of the introduced variables, creating a system of Boolean equations.

Observe the following. First, processing at each site invokes Procedure bottomUp for each fragment $F_j$ stored at the site (see Procedure evalQual). For each such fragment, Procedure bottomUp returns a single triplet ($V_{F_j}, CV_{F_j}, DV_{F_j}$) of vectors that store the (sub-)query values for the root of fragment $F_j$, for its children and its descendants, respectively. Each site sends the computed triplet(s) to the coordinating site and concludes its computation. Second, in addition to the triplets associated with virtual nodes in a fragment, bottomUp needs only two triplets in total in its process: one for the current node ($V_v, CV_v, DV_v$) and one for its children ($V_w, CV_w, DV_w$), rather than assigning a triplet to each node.

EXAMPLE 3.2

Consider the query from the previous example. At the end of the second phase, the following triplets are available to the coordinating site $S_0$:
$V_{F_0}$=<0,0,0,0,$y_4$,0,0,0,$dy_8 \vee dz_8, dy_8 \vee dz_8$>
$CV_{F_0}$=<$y_1 y_2, y_3, y_4 y_5 \vee z_4, y_6, y_7, y_8$,
$y_9 \vee dz_8, y_{10} \vee dz_8$>
$DV_{F_0}$=<$dy_1 \vee dz_1, dy_2 \vee dz_2, dy_3 \vee dz_3, dy_4 \vee dz_4$,
$dy_5 \vee dz_5 \vee z_4 \vee y_4, 1, dy_7 \vee dz_7, dy_8 \vee dz_8$,
$dy_8 \vee dz_8 \vee dy_9 \vee dz_9, dy_8 \vee dz_8 \vee dy_{10} \vee dz_{10}$>
$V_{F_1}$=<0,0,0,0,$x_4$,0,0,0,$dx_8, dx_8$>
$CV_{F_1}$=<0,$x_2, x_3, x_4, x_5, x_6, x_7, x_8, x_9, x_{10}$>
$DV_{F_1}$=<0,$dx_2, dx_3, dx_4, x_4 \vee dx_5, dx_6, dx_7, dx_8$,
$dx_8 \vee dx_9, dx_8 \vee dx_{10}$>$V_{F_2}$=<0,0,0,0,0,0,0,0,0,1>
$CV_{F_2}$=<0,0,0,0,1,1,1,1,1,1>
$DV_{F_2}$=<1,1,1,1,1,1,1,1,1,1>$V_{F_3}$=<0,0,0,0,0,0,0,0,0>
$CV_{F_3}$=<0,0,0,0,0,1,0,0,0,0>
$DV_{F_3}$=<1,0,0,0,0,1,0,0,0,0>
In the triplets, variables $x_i$, $cx_i$ and $dx_i$ for $1 \le i \le 10$ are used in fragment $F_1$ to represent the values of the virtual node $F_2$, while variables $y_i$, $cy_i$, $dy_i$ and $z_i$, $cz_i$, $dz_i$ are used in fragment $F_0$ to represent the values of the virtual nodes $F_1$ and $F_3$, respectively.

Composition of Partial Answers.

In the third phase of Algorithm ParBoX, the coordinating site uses the computed triplets from all the fragments to evaluate the answer to query q. Generally, the computed triplets form a linear system of Boolean equations. Using the computed vectors and the source tree, Procedure evalST needs a single bottom-up traversal of the source tree to solve the system of equations and find the answer to query q. Note that the vectors of leaf fragments in the source tree contain no variables. This is the case for both fragments $F_2$ and $F_3$. During the bottom-up traversal of $S_T$, Procedure evalST uses the Boolean values of the leaf fragments to unify the variables of the vectors that belong to the parent fragments in $S_T$. The procedure continues in this fashion until it reaches the root of $S_T$. The answer for query q is the value of $V_{F_{root}}(q_{last})$, where $F_{root}$ is the root fragment and $q_{last}$ is the last query in the $q_L$ list.

EXAMPLE 3.3

Consider the source tree in FIG. 2B and the vectors of the fragments from our previous example. Then, the answer to query q is the value of the last query in $V_{F_0}$, that is, $q = dy_8 \vee dz_8$. A bottom-up evaluation of Procedure evalST uses $DV_{F_2}$ to unify $dx_8$ to 1; $DV_{F_1}$ to unify $dy_8$ to $dx_8$; and $DV_{F_3}$ to unify $dz_8$ to 0. Therefore, q=1 and the query q evaluates to true.

Analysis

For the complexity of the Algorithm ParBoX, consider its communication cost as well as the total and parallel computation costs for evaluating a query q on a fragmented and distributed tree T. The total computation cost is the sum of the computation performed at all the sites that participate in the evaluation. In contrast, the parallel computation cost is the time needed for evaluating the query at different sites in parallel. Since a large part of the evaluation is performed in parallel, the parallel computation cost more accurately describes the performance of the algorithm.

The following notation is used: F denotes the set of all fragments of the original tree T, and $F_j \subseteq F$ denotes the subset of fragments of T that are sub-fragments of fragment $F_j$. Card (X) denotes the cardinality of a set X.

Total Network Traffic.

Observe that each site appearing in the source tree $S_T$ of tree T is visited only once, when the coordinating site sends the input query q to these sites in the first stage. For each fragment $F_j$ in site $S_j$ the algorithm generates three vectors, each with O(|q|) entries. Each entry may hold a formula computed by Procedure bottomUp, and its size depends on the number of virtual nodes in fragment $F_j$, i.e., card($F_j$), due to the variables introduced by these virtual nodes. In the worst case, the size of the entry is in O(|$F_j$|). Therefore, the communication cost for each fragment $F_j$ is O(|q|card($F_j$)) and the overall communication cost of the algorithm is $$O\left(|q| \sum_{j=1}^{card(F)} card(F_j)\right),$$

that is, O(|q|card(F)) (since fragments are disjoint).

Total Computation.

Site S traverses each fragment $F_j$ assigned to it only once (through Procedure bottomUp). At each node v in a fragment, the procedure takes $O(|q|)$ time and therefore, the cost of the procedure on fragment $F_j$ is $O(|q||F_j|)$. Adding these up for all fragments of tree T, the total amount of computation in the second phase of the algorithm is $O(|q||T|)$. The third phase of the algorithm solves, in linear time, a system of Boolean equations which is of size $O(|q|card(F))$. Overall, the total amount of computation of Algorithm ParBoX is $O(|q|(|T|+card(F)))$.

Parallel Computation.

The cost of the second phase may differ depending on the level of parallelism. Intuitively, as sets of fragments ate assigned to different sites, the cost of the second phase is equal to the computation cost at the site holding the set with the largest aggregated fragment size. $|F_{S_i}|$ is used to denote the sum of the sizes of the fragments in site $S_i$. Then, the time taken by the second phase is $$O\left(|q|\max_{S_i}(|F_{S_i}|)\right)$$

and the parallel computation cost of the algorithm is $$O\left(|q|\left(\max_{S_i}(|F_{S_i}|) + card(F)\right)\right).$$

In any reasonable setting, the number of fragments to which a tree is decomposed will be small compared to the size of the tree itself, i.e., $card(F) \ll |T|$. Thus, given a decomposition of a tree T to a set of fragments, the disclosed algorithm has the desirable property that the communication cost of evaluating a query q over T is independent of the size $|T|$ of the tree and depends mainly on the size $|q|$ of the query. Similarly, the total computation cost of our algorithm becomes $O(|q||T|)$, comparable to that of the best-known centralized algorithm for evaluating an XPath query q over a tree T. Furthermore, the parallel computation cost depends only on the size of the largest aggregated fragment size assigned to a site.

Variations of Algorithm ParBoX

Algorithm ParBoX can be adapted to various settings.

Hybrid ParBoX.

Although very unlikely to occur, it is instructive to study the pathological case in which each node v of our document tree T constitutes a separate fragment F and it is assigned to a different site. Then, $card(F)=|T|$. Even in this pathological case, the computation cost of our algorithm is still optimal. However, the communication cost becomes $O(|q||T|)$, no longer independent of the tree T. Consider now the algorithm NaiveCentralized outlined above. The computation cost of the naive algorithm is still $O(|q||T|)$ but its communication cost is only $O(|T|)$. Therefore, for the pathological case considered, the naive algorithm has less communication overhead than Algorithm ParBoX. This leads to a hybrid algorithm that, depending on the decomposition of the input tree T, behaves like Algorithm ParBoX for most decompositions but switches to the naive algorithm for pathological decompositions.

The tipping point in this switching of behavior is determined by comparing $card(F)$ and $$\frac{|T|}{|q|}.$$

As long as $$card(F) < \frac{|T|}{|q|},$$

Algorithm ParBoX has less communication overhead than the naive algorithm. The total computation cost of the hybrid algorithm is $O(|q||T|)$ while its communication cost is $O(|T|)$, in the worst case, and $O(|q|card(F))$ on average. The parallel computation cost of Hybrid ParBoX is the same as that of Algorithm ParBoX.

Full Distribution of Computation.

When a large number of queries are submitted to the same coordinating site, the coordinating site might turn out to be a system bottleneck. As the coordinating site has to collect and process the partial answers of participating sites, it might be overwhelmed by both the amount of incoming traffic and the size of data to be processed. This issue is addressed in a new algorithm called FullDistParBoX by distributing the computation of the third phase of Algorithm ParBoX among all the participating sites. The first two phases of Algorithm FullDistParBoX are the same as those of ParBoX. During the third phase, Algorithm FullDistParBoX calls procedure evalDistrST instead of Procedure evalST.

Generally, Procedure evalDistrST assumes that each participating site holds a copy of the source tree $S_T$. Given that the size of $S_T$ is expected to be much smaller than the size of T, the assumption adds minimum storage overhead per site. The procedure proceeds in a bottom-up fashion in $S_T$ by considering initially the sites that appear as leaves in $S_T$. Consider such a site S and assume that it is responsible for a leaf fragment F. Site S sends the triplet of vectors corresponding to F to its parent site S' in $S_T$. A non-leaf site, like site S', considers each local fragment F' and, after receiving the triplets of all sub-fragments of F', S' executes locally. Procedure evalST using the received triplets along with the triplet for F'. Then, it sends the resulting triplet for F' to its parent site in $S_T$. Note that S' and S still partially evaluate their local fragments in parallel in the second stage of the algorithm. Also note that no variables appear in the resulting triplet of vectors of F'. The process terminates when it reaches the site at the root of $S_T$. Procedure evalDistrST has the same total/parallel computation and communication costs as Procedure evalST. Thus Algorithm FullDistrParBoX is similar to Algorithm ParBoX. In practical terms, the communication cost of the former algorithm should be lower than that of the latter. Indeed, in the former, no variables are sent between sites since they are always unified, before any vector is sent. Although Algorithm FullDistParBoX removes the need for a coordinating site it has the drawback that a site might be visited multiple times, once fox each time it appears in $S_T$.

Lazy Computation.

Algorithm ParBoX is eager in that it requests all the sites to evaluate the queries in QList(q) over all their fragments. This approach maximizes parallelism but it does, in certain cases, result in unnecessary computation. To see why this is so, consider the following query, which checks whether there exists in our collection any broker with the name "Merill Lynch":

[/portofolio/broker/name="Merill Lynch"]

Note that although the query does not need to be computed on fragments $F_2$ and $F_3$, Algorithm ParBoX will do so. A lazy strategy can be employed that evaluates the query in increasing depths of the site tree $S_T$ until it obtains an answer to the query that does not depend on any fragments further' down the source tree than the currently evaluated depth.

Algorithm LazyParBoX traverses the source tree $S_T$ in pre-order. At the $i^{th}$ traversal step of the traversal, the coordinating site identifies all the sites that hold fragments at depth i from the root of the source tree. For each of these sites, the coordinator requests the evaluation of Procedure evalQual for the corresponding fragments. The coordinating site collects the evaluated vectors for all these fragments and, along with the vectors collected from previous traversal steps, it calls Procedure evalST to compute the answer to the query. Only if no answer can be computed, due to variables that cannot be unified, the algorithm performs one more step. The total computation cost of Algorithm LazyParBoX is the same as that of ParBoX. However, in cases such as the last example, the algorithm behaves better than ParBoX. In the example, LazyParBoX does not evaluate the query over fragment $F_2$, since after one step the given query is evaluated to true. In terms of parallel computation, Algorithm LazyParBoX is worse than ParBoX since in each traversal step only one fragment is evaluated per site, and only fragments at the same level of the source tree are computed in parallel. Thus, the parallel computation cost of the algorithm is $$O(|q| \, ||\text{card}(F) \max_F(|F_i|)),$$

where $$\max_F(|F_i|)$$

denotes the size of the maximum fragment of tree T.

The discussion of these algorithms is summarized in FIG. 4, which lists the number of times each site is visited, the total (T) and parallel (P) computation costs, and the communication costs. Recall that the first two naive algorithms do not exploit parallelism and thus their total computation costs are reported. In FIG. 4, $\text{card}(F_{S_i})$ is used to denote the number of fragments that reside in site $S_i$.

Incremental View Maintenance

As indicated above, one often wants to cache the result of a query, treat it as a materialized view, and use it to answer possible future queries. When a new query is issued, the materialized views are used to provide part of, or the whole of, the answer to the query. With this comes the issue of view maintenance: when the source data is updated, the materialized views must be maintained so as to reflect the current source contents. An approach to maintaining views is by means of an incremental technique: given a query Q, a database I, a view V=Q(I) and updates $\Delta_I$ on the source I, update $\Delta_V$ is computed on the view such that $V \oplus \Delta_V = Q(I \oplus \Delta_I)$. Incremental maintenance of views has proven effective in many applications, since small changes $\Delta_I$ to the source often inflict only small changes $\Delta_V$ to the view, and thus it is often more efficient to compute $\Delta_V$ rather than computing the view $Q(I \oplus \Delta_I)$ starting from scratch.

A mechanism is provided to support incremental view maintenance that is based on extensions of the XPath evaluation algorithms. The exemplary incremental algorithms have the following salient features. (a) The cost of maintaining materialized views depends neither on the size of the data nor on the size of the update. (b) The recomputation is localized to the fragments where the updates occur.

Materialized View.

A materialized view M of a query q over a tree T, denoted as M(q,T), is a pair ($S_T$,ans), where $S_T$ is the source tree of T and ans is the cached answer of the query q over T. The pair ($S_T$,ans) is referred to as the state of view M. A view is materialized at a site if the site maintains its state. The disclosed maintenance algorithm imposes minimum overhead on the site, since only the query, the source tree and the answer' need to be stored.

Update Operations.

Consider two classes of updates that can alter the state of a materialized view: the first alters the contents of the tree T and the second alters the fragmentation of T. For each class, there are two primitive operations, which are listed below. All operations are defined with respect to a fragment $F_j$ of tree T.

(1) insNode(A, v): inserts in $F_j$ a node labeled A as a child of node v. The operation returns the newly inserted node.

(2) delNode(v): deletes from $F_j$ the node v.

(3) splitFragments(v): creates a new fragment $F_k$ which is the subtree rooted at node v. The new fragment $F_k$ is a subfragment of $F_j$ and its subtree is replaced in $F_j$ by a virtual node whose label is $F_k$.

(4) mergeFragments(v): merges fragment $F_j$ with the subfragment that corresponds to the virtual node v. If v is not virtual, no action is taken.

EXAMPLE 5.1

Figure 5:
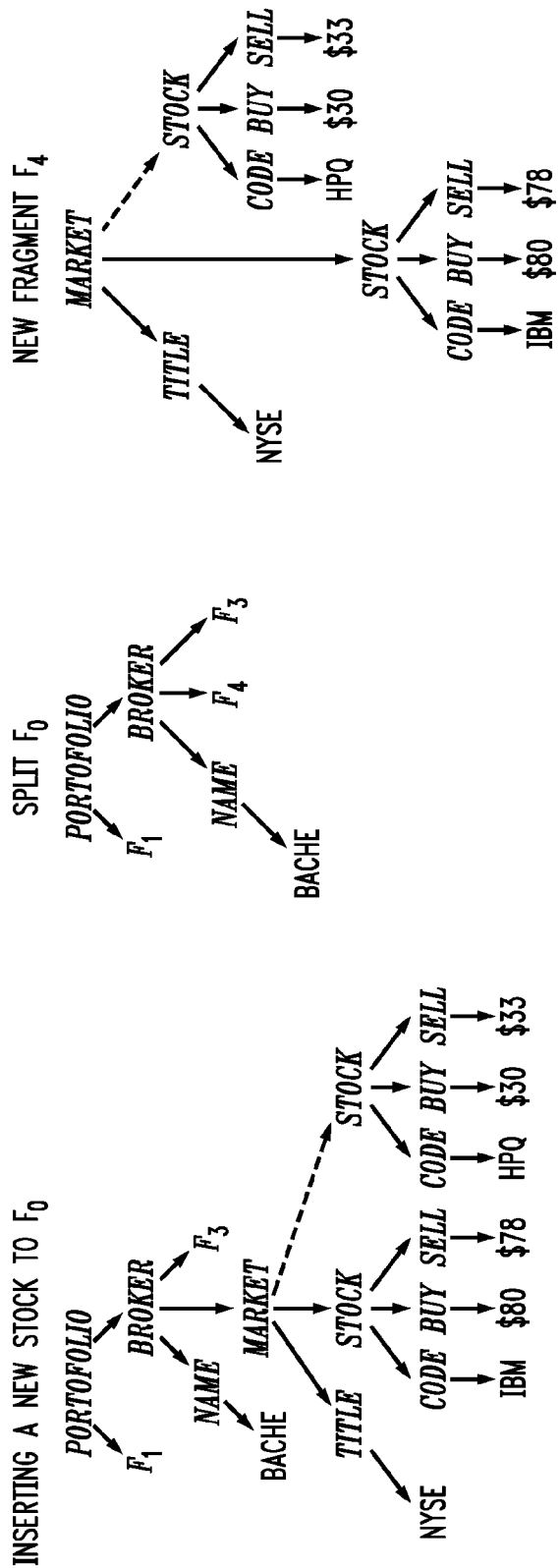
FIG. 5 illustrates exemplary updates and fragments on XML trees in accordance with examples of the present invention.

Consider fragment $F_0$ in FIG. 2A. A series of insNode operations can be used to insert a new stock in the fragment, yielding the fragment in the left side of FIG. 5. The new subtree is indicated by dotted lines. Continue by applying operation splitFragments(market) to the new fragment and get two fragments: a revised $F_0$ and a new fragment $F_4$ shown in FIG. 5. Note that the subtree looted at the market node is replaced by a virtual node $F_4$. Fragment $F_4$ can now be assigned to another site, say, $S_3$.

Since the first two operations concern the contents of a fragmented tree T, they only affect the ans part of the state of a view M(q,T). Given a series of insertions and/or deletions in a fragment $F_j$, Algorithm ParBoX is extended to incrementally update ans; extensions to the variations of the Algorithm ParBoX are done similarly.

Algorithm Outline.

To incrementally update ans, it suffices to augment the state of M(q,T) so that the triplets ($V_{F_k}$, $CV_{F_k}$, $DV_{F_k}$) are maintained, for each of the fragments $F_k$ of T. After the series of insertions and/or deletions in fragment $F_j$, only the site storing $F_j$ needs to call. Procedure bottomUp and only for fragment $F_j$. The resulting triplet ($V_{F_j}^{new}$, $CV_{F_j}^{new}$, $DV_{F_j}^{new}$) is sent back to the site S storing the state of M(q,T). The triplet is then compared with the one stored in S for the same fragment $F_j$. If they are identical, incremental evaluation terminates without changing the value of ans. Otherwise site S uses the new triplet, along with the triplets for the other fragments, in Procedure evalST to compute the new value of ans.

The total (and parallel) computation cost of the incremental algorithm is $O(|q|(|F_j|+card(F)))$ while the communication cost is $O(|q|card(F_j))$, where $|F_j|$ is the size of the fragment $F_j$ while $card(F_j)$ and $card(F)$ are the number of sub-fragments of $F_j$ and $T$, respectively. Observe that the communication cost is independent of both $|T|$ and the size of the updates. Furthermore, recomputation is localized to fragment $F_j$, in which updates take place.

Now consider splitfragments(v), which splits a fragment $F_j$ into two fragments $F_j^{new}$ and $F_k$. Obviously, the splitting does not affect the value of ans. However, both the source tree $S_T$ and the corresponding fragment vector triplets must be updated. This update is local to the site $S$ storing the state of $M$. The only other site involved in the process is site $S'$ where fragment $F_j$ used to reside. Site $S'$ needs to send to site $S$ two new vector triplets, one for $F_j^{new}$ and one for $F_k$. It is not hard to see that the total (and parallel) computation cost for these operations is $O(|q||F_j|)$, while the communication cost is $O(|q|card(F_j))$. The analysis for mergeFragments(v) is similar and results are within the same bounds, where $F_j$ now denotes the fragment that is the result of merging.

Figure 6:
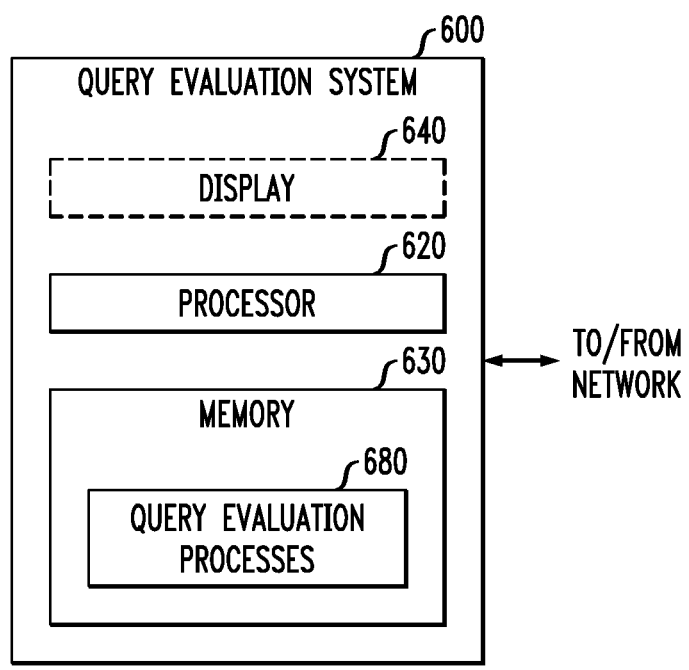
FIG. 6 is a block diagram of a system that can implement the processes of the present invention.

In order to illustrate the differences between ParBoX and its variations, fragment trees are used that are similar to tree FT2, shown in FIG. 6. Starting with fragment $F_0$ and in each iteration j, a new fragment $F_j$ is added as a sub-fragment of fragment $F_{j-1}$. Note that fragment trees like FT2 appear often in practice. For example, in a temporal database each fragment can represent an XMark "site" at a point in time. Then, FT2 represents the version history of this XMark "site" 50 MB of data is distributed evenly among the fragments in each iteration.

First consider a boolean query $q_{F_0}$ that is executed in the (coordinating) machine holding fragment $F_0$ and it is satisfied by fragment $F_0$. The evaluation (parallel computation) times for all algorithms are almost identical, while the total computation for the first two algorithms is much larger (not shown). Algorithms ParBoX and FullDistParBoX evaluate $q_{F_0}$ over all the fragments of FT2, in parallel, while LazyParBoX by design is only evaluated in fragments $F_0$ and $F_1$. Recall that LazyParBoX initially evaluates a query only in the coordinator and in the fragments of depth 1 in the fragment tree. Since $F_0$ satisfies $q_{f_0}$ no other fragment needs to be evaluated in LazyParBoX.

The additional fragments considered in the first two algorithms have no overhead in the perceived evaluation time since (a) all fragments have the same size (b) each fragment is in a different machine (c) all evaluation is done in parallel. It is noted that in LazyParBoX only two machines evaluate $q_{F_0}$ while all the other machines are idle. In addition, network traffic and communication delays in the partial evaluation algorithms are negligible. Data fragments are not sent between machines. In spite of the overall small traffic, FullDistParBoX still results in at most half the traffic of ParBoX. These savings are due to FullDistParBoX not sending any variables.

Next consider a boolean query $q_{F_n}$ that is executed in the (coordinating) machine holding fragment $F_0$ and is carefully selected so that it is satisfied by the last fragment $F_n$ in each iteration. FIG. 10 shows the evaluation times of ParBoX, FullDistParBoX and LazyParBoX of $q_{F_n}$ for each iteration. Note that in the first two iterations, by design, all algorithms evaluate $q_{F_n}$ in parallel, in both fragments $F_0$ and $F_1$. In subsequent iterations, algorithms ParBoX and FullDistParBoX both continue to evaluate $q_{F_n}$ in parallel, in all the fragments in FT2 and thus they have almost identical evaluation times. However, the evaluation time of LazyParBoX starts to increase since the algorithm has to consider sequentially the fragments in increasing depths of the tree, until it reaches fragment $F_n$ where the query is satisfied. Due to this sequential access, the evaluation time of LazyParBoX is the sum of the evaluation times in fragments $F_2$ to $F_n$ plus the (parallel) evaluation time of fragments $F_0$ and $F_1$. The increase between iterations is not linear since as the 50 MB data are re-distributed between iterations, the total additional data needed to sequentially evaluate between iterations i and (i+1) are only $$\frac{50}{i \times (i+1)}.$$

So, between iterations two and three, the evaluation time is that of iteration two plus the cost of evaluating the query additionally over 8.3 MB of data, while between iteration nine and ten the additional data are only 0.5 MB.

Finally, consider a boolean query $q_{F_{\lceil n/2 \rceil}}$ that is executed in the (coordinating) machine holding fragment $F_0$ and in each iteration, it is satisfied by the $F_{\lceil n/2 \rceil}$ fragment, in the middle of ST2. FIG. 8 shows the evaluation times of ParBoX, FullDistParBoX and LazyParBoX of $q_{F_{\lceil n/2 \rceil}}$ for each iteration. Again for the first two iterations, all three algorithms behave the same. Starting at iteration three, the evaluation time of LazyParBoX starts to oscillate until it converges to a value of approximately 2.5 seconds. This is because starting at iteration three, and every other iteration, the depth of fragment $F_{\lceil n/2 \rceil}$ is increased by one. So, the depth of $F_{\lceil n/2 \rceil}$ is 2 in iterations three and four, while it is 3 in iterations five and six. If the depth of $F_{\lceil n/2 \rceil}$ is constant between two consecutive iterations i and (i+1), the evaluation time of LazyParBoX improves since fragments up to the same depth of tree are considered in both iterations, but in iteration (i+1) less data ate traversed (due to the re-distribution of data). This is the case for iteration pairs 3 and 4, 5 and 6 etc. Now, if the depth of $F_{\lceil n/2 \rceil}$ increases between two consecutive iterations i and (i+1), LazyParBoX considers one additional fragment in iteration (i+1). Therefore, there is a slight increase in evaluation time. This is the case for iteration pairs 4 and 5, 6 and 7 and so on. As the size of fragments reduces in later iterations, the gains (losses) in evaluation times are also reduced. This is due to corresponding reduction in the size of less (additional) data considered between consecutive iterations. If it is assumed that a query is satisfied, on average, by a fragment close to the middle of the fragment tree, then this experiment shows that in LazyParBoX query evaluation is approximately 3 times slower than ParBoX. However, LazyParBoX saves half of the total computation done by ParBoX. Clearly, one is often willing to trade evaluation time for reduced site load. For a more detailed discussion, see P. Buneman et al., "Using Partial Evaluation in Distributed Query Evaluation," Proc of the 32nd Int'l Conf. on Very Large Data Bases (2006), incorporated by reference herein.

FIG. 6 is a block diagram of a system 600 that can implement the processes of the present invention. As shown in FIG. 6, memory 630 configures the processor 620 to implement the query evaluation methods, steps, and functions disclosed herein (collectively, shown as 680 in FIG. 6). The memory 630 could be distributed or local and the processor 620 could be distributed or singular. The memory 630 could be implemented as an electrical, magnetic or optical memory, or any combination of these or other types of storage devices. It should be noted that each distributed processor' that makes up processor 620 generally contains its own addressable memory space. It should also be noted that some or all of computer system 600 can be incorporated into an application-specific or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for evaluating a query over a tree having a plurality of fragments distributed over a plurality of sites, said method comprising:
   identifying said plurality of sites storing at least one of said plurality of fragments of said tree;
   providing said query to said plurality of identified sites, wherein each of said identified sites partially evaluates said query against one or more fragments of said tree stored by said respective site;
   obtaining partial results from said plurality of identified sites; and
   composing said partial results to compute a result to said query.

2. The method of claim 1, wherein said query is a boolean XPath query.

3. The method of claim 1, wherein said method is performed by a coordinating site that stores a root fragment of said tree.

4. The method of claim 1, wherein said identifying step further comprises the step of evaluating a source tree.

5. The method of claim 1, wherein said identified sites partially evaluate said query substantially in parallel.

6. The method of claim 1, wherein said partial evaluation at each site and for each fragment comprises the step of performing a bottom-up evaluation of said query.

7. The method of claim 1, wherein said partial results comprise one or more boolean equations.

8. The method of claim 7, wherein said one or more boolean equations decouple dependencies between partial evaluation processes at said plurality of sites.

9. The method of claim 1, wherein said computed result is obtained from a linear scan of said partial results.

10. The method of claim 1, wherein each of said plurality of sites are visited once during a performance of said method.

11. The method of claim 1, wherein said composing step is distributed among at least two of said sites.

12. The method of claim 1, further comprising the step of determining if said result can be obtained from a partial evaluation performed by only a subset of said plurality of sites.

13. The method of claim 1, further comprising the step of updating a portion of said partial results when one or more fragments of said tree are updated.

14. A system for evaluating a query over a tree having a plurality of fragments distributed over a plurality of sites, said system comprising:
   a memory; and
   at least one processor, coupled to the memory, operative to:
   identify said plurality of sites storing at least one of said plurality of fragments of said tree;
   provide said query to said plurality of identified sites, wherein each of said identified sites partially evaluates said query against one or more fragments of said tree stored by said respective site;
   obtain partial results from said plurality of identified sites; and
   compose said partial results to compute a result to said query.

15. The system of claim 14, wherein said query is a boolean XPath query.

16. The system of claim 14, wherein said system is performed by a coordinating site that stores a root fragment of said tree.

17. The system of claim 14, wherein said identified sites partially evaluate said query substantially in parallel.

18. The system of claim 14, wherein said partial results comprise one or more boolean equations.

19. The system of claim 14, wherein said computed result is obtained from a linear scan of said partial results.

20. An article of manufacture for evaluating a query over a tree having a plurality of fragments distributed over a plurality of sites, comprising a non-transitory machine readable medium containing one or more programs which when executed implement the steps of:
   identifying said plurality of sites storing at least one of said plurality of fragments of said tree;
   providing said query to said plurality of identified sites, wherein each of said identified sites partially evaluates said query against one or more fragments of said tree stored by said respective site;
   obtaining partial results from said plurality of identified sites; and
   composing said partial results to compute a result to said query.

* * * * *

UNITED STATES PATENT AND TRADEMARK OFFICE
CERTIFICATE OF CORRECTION

Page 1 of 2

PATENT NO. : 8,745,082 B2
APPLICATION NO. : 11/771286
DATED : June 3, 2014
INVENTOR(S) : Gao Cong et al.

It is certified that error appears in the above-identified patent and that said Letters Patent is hereby corrected as shown below:

In the specification

Column 1, line 39, replace "refereed" with --referred--.

Column 1, line 49, replace "herein Dataflow" with --herein. Dataflow--.

Column 2, line 5, replace "father comprises" with --further comprises--.

Column 2, line 10, replace "mote boolean" with --more boolean--.

Column 3, line 9, replace "values ate" with --values are--.

Column 3, line 15, replace "variables A partial" with --variables. A partial--.

Column 3, line 20, replace "Irrespectively" with --irrespective--.

Column 3, line 25, replace "F or" with --For--.

Column 3, lines 37 and 38, replace "directories FIGS. 2A" with --directories. FIGS. 2A--.

Column 3, line 61, replace "assumptions ate" with --assumptions are--.

Column 5, line 7, replace "sites ate" with --sites are--.

Column 5, line 9, replace "stole in a" with --store in a--.

Column 5, line 23, replace "toot" with --root--.

Column 5, line 42, replace "ate leaf" with --are leaf--.

Signed and Sealed this
Twenty-second Day of March, 2016

Michelle K. Lee
*Director of the United States Patent and Trademark Office*

CERTIFICATE OF CORRECTION (continued)
U.S. Pat. No. 8,745,082 B2

In the specification

Column 5, line 58, replace "not used" by --nor used--.

Column 6, line 15, replace "it and" with --if and--.

Column 7, line 52, replace "algorithrn" with --algorithm--.

Column 8, line 34, replace "dependencies ate" with --dependencies are--.

Column 9, lines 36 and 37, replace "fragment. Procedure" with --fragment, procedure--.

Column 10, line 43, replace "that ate sub-fragments" with --that are sub-fragments--.

Column 10, line 43, replace "Fj Card" with --Fj. Card--.

Column 11, line 12, replace "fragments ate" with --fragments are--.

Column 15, line 24, after "FIG. 6" please add --of P. Buneman et al. (2006), incorporated by reference above.--.

Column 15, line 29, replace ""site" 50" with --"site." 50--.

Column 15, line 59, after "FIG. 10" please add --of P. Buneman et al. (2006),--.

Column 16, line 23, after "FIG. 8" please add --of P. Buneman et al. (2006),--.

Column 16, line 36, replace "ate traversed" with --are traversed--.